United States Patent [19]
Ryden, Jr.

[11] 3,930,404
[45] Jan. 6, 1976

[54] INSIDE DIAMETER, OUTSIDE DIAMETER AND WALL TUBE GAGE

[75] Inventor: Joseph Ryden, Jr., Richland, Wash.

[73] Assignee: Exxon Nuclear Company Inc., Bellevue, Wash.

[22] Filed: June 21, 1973

[21] Appl. No.: 372,202

[52] U.S. Cl. .............................. 73/67.8 R; 73/67.9
[51] Int. Cl.² .................. G01N 29/00; G01B 17/02
[58] Field of Search............ 73/67.7, 67.8 R, 67.8 S, 73/67.9

[56] References Cited
UNITED STATES PATENTS

| | | | |
|---|---|---|---|
| 3,554,014 | 1/1971 | Berg et al. | 73/67.8 R |
| 3,599,478 | 8/1971 | Weinbaum | 73/67.7 |
| 3,636,778 | 1/1972 | Huffstetler | 73/67.8 R |
| 3,732,726 | 5/1973 | Ferber | 73/67.5 R |
| 3,828,609 | 8/1974 | Furon et al. | 73/67.8 S |

*Primary Examiner*—Charles A. Ruehl
*Attorney, Agent, or Firm*—F. Donald Paris

[57] ABSTRACT

An ultrasonic apparatus and technique for rapidly and accurately measuring the inside and outside diameters and wall thickness of a tubular material. The tubes are passed between a pair of diametrically opposed ultrasonic transducers for obtaining the necessary data. A third transducer is employed to obtain a reference signal, which is used to automatically compensate for any temperature variations in the ultrasound couplant medium.

20 Claims, 6 Drawing Figures

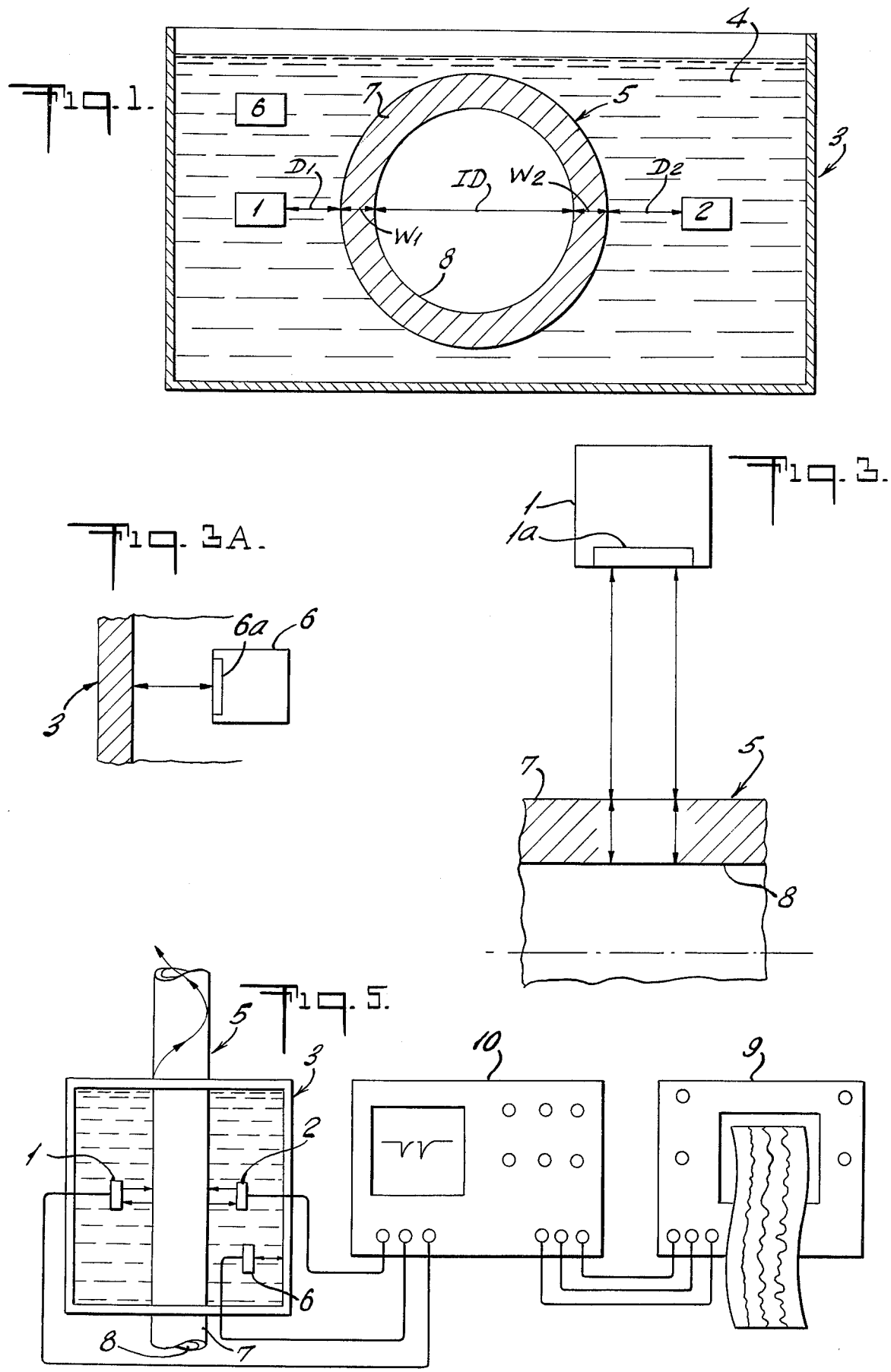

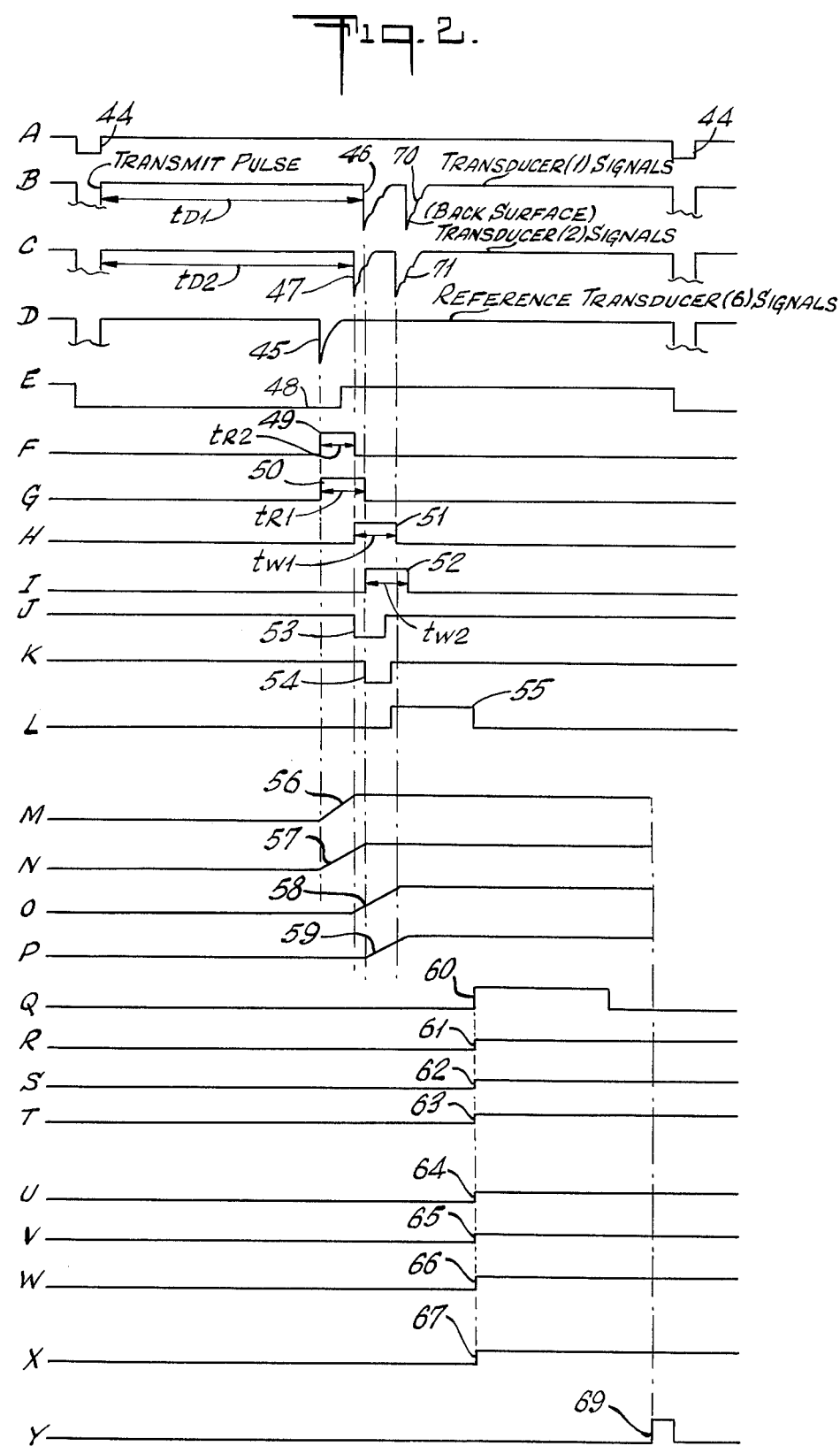

INSIDE DIAMETER, OUTSIDE DIAMETER AND WALL TUBE GAGE

BACKGROUND OF THE INVENTION

The measurement of material thickness by the use of ultrasonics is a common inspection technique. Generally, there are two types of ultrasonic thickness measurement techniques comprising the resonance method and the pulse-echo technique. Resonance tests are limited in application, particularly in the tubing industry, because of the low measurement sampling rates that are used by instruments employing this technique. Use of the pulse-echo thickness measurement technique, is more prevalent today than the resonance method primarily because of its higher measurement sampling rate.

An air gage technique is commonly employed for measuring inside and outside tube diameters. Although the accuracy of this technique is high, it is quite slow and requires an internal probe, which may scratch the tube. It is not possible to measure wall thickness by the air gaging technique.

One technique which is used to perform the inside and outside diameters and wall thickness measurements simultaneously relies on the use of capacitance probes. This particular technique also requires contacting an inside probe to measure the internal diameter of the tubing. Generally, such a probe would have a tendency to scratch the tube surface and also restricts the speed at which the tube can be rotated while passing the transducers. Measurement of the wall thickness requires maintaining a very precise relative alignment between the inside and outside capacitance probes while the tube is conveyed past the probe. This is exceedingly difficult, particularly if the tube is rotated at a relatively high rpm.

Other disclosures of prior art ultrasonic techniques primarily used for measuring thickness of a workpiece are typified by the disclosure in the Berg et al U.S. Pat. No. 3,554,014. Other patents considered in connection with this invention include: Zemanek et al., U.S. Pat. No. 3,426,585; Mitchell et al., U.S. Pat. No. 3,474,664; Weinbaum, U.S. Pat. No. 3,599,478.

SUMMARY OF THE PRESENT INVENTION

The present inside diameter, outside diameter and wall tube gaging system overcomes the deficiencies of the prior art and satisfies a long-existing need to provide a gaging system wherein all three of the aforementioned measurements are performed simultaneously in a rapid and efficient manner. In addition to these advantages, the present system also obtains measurements without the need for contacting the tube (thus, avoiding possible scratching); it permits the tubes to be measured on a helical path by rotating and translating them past the transducers, which has the advantage of providing a more complete inspection of the tubing for dimensional conformance than if the tubing were not rotated. Also, according to the present invention, all three dimensions are displayed separately on a mutli-tri-channel strip chart recorder which permits tube ovality to be quickly ascertained from the charts. Furthermore, the gage measurements of this invention are repeatable to a very small variation of about ± 0.0002 inch. Measurements are not affected by tubing material property variables such as permeability whereas prior art devices such as eddy current systems, are highly sensitive to normally occuring permeability changes from tube to tube, thus rendering such a device unusable.

Briefly, the present invention comprises a gaging system which employs a pair of like utrasonic transducers, which are positioned diametrically opposite and immersed in suitable energy coupling medium such as a water bath. The tubing to be measured is simultaneously rotated and translated between the transducers to produce a helical inspection path. The transducers, which consist of piezoelectric crystals mounted in a casing, are repetitively pulsed by high voltage spikes from an electronic circuit. The ultrasonic energy (signals) produced by these crystals travels through the coupling medium to the outer tube surface where a portion is reflected back to the crystals. The remaining energy enters the tube wall and travels to the inner tube surface, before being reflected back to the crystals. These ultrasonic signals are converted to corresponding electrical signals by the crystals and are electronically processed to provide an indication of the inside and outside tube diameters and the wall thickness.

BRIEF DESCRIPTION OF THE DRAWINGS

FIG. 1 schematically illustrates the physical arrangement of the transducers in relation to the tubing according to the present invention.

FIG. 2 illustrates a timing chart of the various signals utilized in the gaging system of FIGS. 1 and 4.

FIG. 3 illustrates the preferred transducer configuration employed in this invention.

FIG. 3a illustrates the disposition of the reference transducer employed in this invention.

FIG. 5 illustrates a typical actual arrangement for the present invention.

DESCRIPTION OF THE PREFERRED EMBODIMENT

Figure 4:
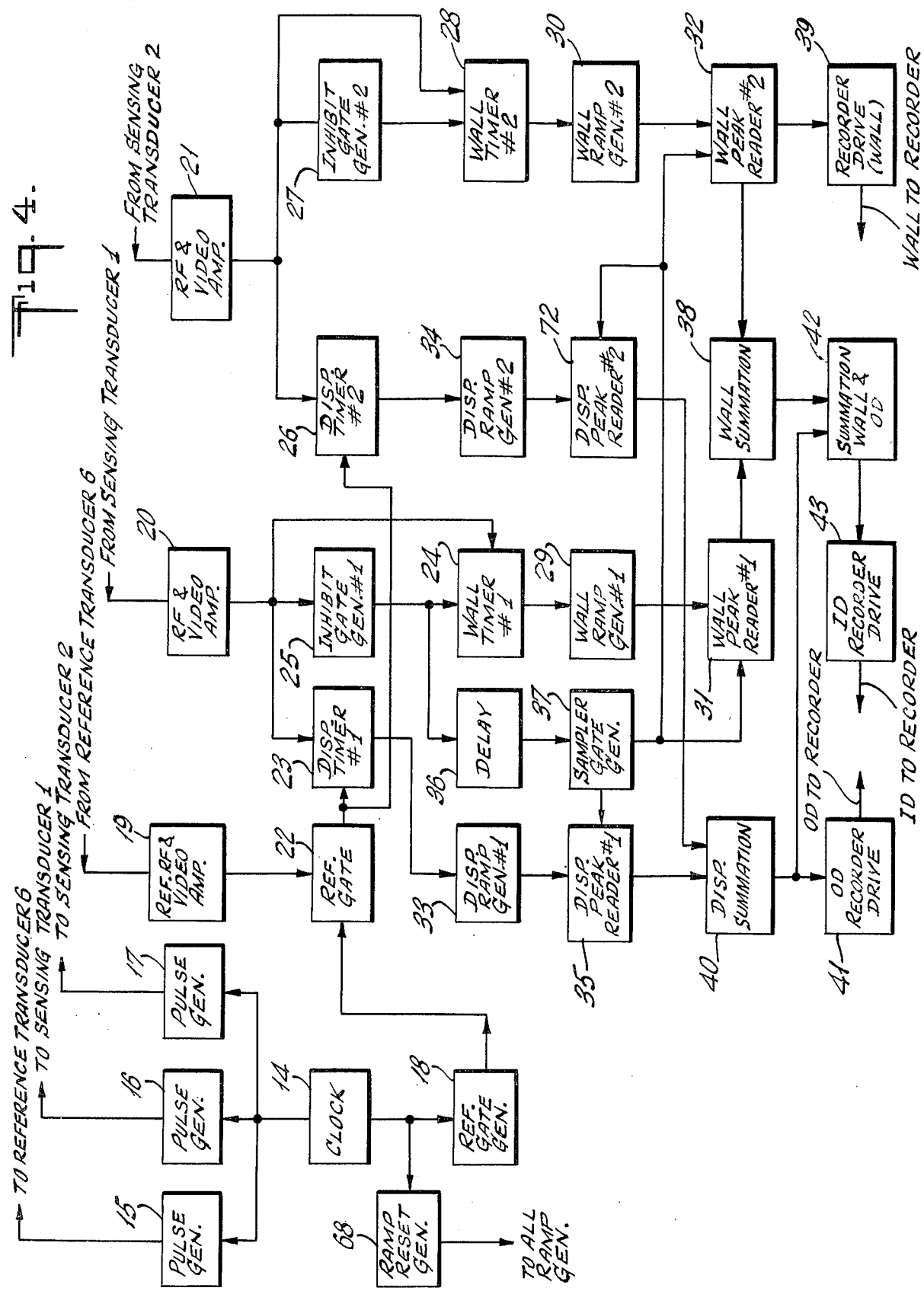
FIG. 4 illustrates a block diagram of the preferred electronics which may be employed in this invention.

Having reference to the drawings wherein like parts are designated by the same reference numerals throughout the several views, FIG. 1 illustrates a pair of identical transducers 1 and 2 positioned diametrically opposite each other and immersed in a tank 3 containing a suitable energy coupling medium such as water 4. The tubing 5 to be measured is simultaneously rotated and translated between the transducers to produce the required helical inspection path (also see FIG. 5). Such a path is necessary to provide as complete inspection of the tubing as required. The means employed for rotation and longitudinal movement of the tubing may be of any suitable conventional type. Such units are commonly designated as either, tube handling systems or tube transport systems. Each transducer transmits and receives ultrasonic energy and comprises a piezoelectric crystal. The transducer can be mounted in the tank 3 by means of conventional transducer holders and manipulators. These crystals are repetitively pulsed by a high voltage spike received from the associated electronics. The ultrasonic energy produced by the crystals in response to these pulses travels through the water, which is used as a coupling medium, to the outer tube surface 7 where a portion is reflected back to the crystal from which it came and the remaining energy enters the tube wall. The interior of the tubing is not filled with water (i.e., is void) and acts as a buffer. The energy which enters the tube wall travels to the inner tube surface 8 where it is reflected back outwardly to the crystal from which it came. See FIG. 3. These ultrasonic signals are converted to corresponding electrical signals by the crystals and are then appropriately processed through the electronics to be described in greater detail hereinafter. Typical signals produced may be viewed on the oscilloscope and are shown in the timing chart of FIG. 2.

The time span designated is the time between the two successive transmitter pulses. The time it takes for the ultrasonic wave to travel from a transducer to a tube surface and back maybe given by the following well known equation:

$$t = 2d/V$$

where $t$ is time; $d$ is distance between transducer and tube; and $V$ is velocity of the ultrasonic wave in water.

It is apparent that a $t$ time measurement proportional to the outside tube diameter can be obtained by summing the two time intervals $t_{D1}$ and $t_{D2}$ as shown in FIG. 2. By subsequently converting these times to a proportional voltage this allows the information to be placed on a strip chart recorder. One problem, however, is that the velocity of the ultrasound in the water is temperature dependent. Although water is employed, other mediums such as oil also may be employed. Thus, if the velocity changes then $t_{D1}$ and $t_{D2}$ change accordingly, and the outside diameter measurement would be in error by that deviation.

According to the present invention, automatic compensations are made for the water temperature variations. This accomplished by using a third transducer 6 which is disposed to direct its energy beam at a fixed surface such as the side wall of the water tank 3. See FIG. 3a. This reference transducer 6 is pulsed simultaneously (as shown by time sequence in FIG. 2) with the other transducers 1 and 2. As shown in FIGS. 2A, 2B and 2D the electrical signal 45 received by the reference transducer 6 occurs shortly (about 1 microsecond) before the outer tube surface signals 46 and 47 are received by the sensing transducers 1 and 2. Instead of measuring $t_{D1}$ and $t_{D2}$ to obtain the outside tube diameter measurement, the time intervals between the tank wall signal 45 and the outer tube surface signals 46 and 47 from each sensing transducers, are measured and then converted to a proportional voltage and summed. These time intervals are shown as $tr_1$ (50) and $tr_2$ (49) in FIGS. 2G and F repectively. If the water temperature varies and subsequently causes a change in ultrasonic velocity, the time occurrence of the tank wall and the two outer tube surface signals will vary also. However, the time interval between them will remain constant and thus the system is automatically compensated for water temperature changes. In the case of using other coupling mediums, temperature compensation automatically can be accomplished in a similar manner.

By measuring the time intervals $tw_1$ and $tw_2$ (see FIGS. 2H and 2I) and converting these times to voltages, then summing the voltages and thereafter subtracting this sum from the outside diameter voltage, the inside diameter of the tubing may be obtained. These time intervals comprise the time interval between the outside surface 7 and inside surface 8 signals as shown in FIGS. 2B and C. The wall thickness measurement data from one of the two sensing transducers is used for recording together with the inside diameter and outside diameter measurements.

As shown in FIG. 3, each of the tube measuring or sensing transducers, 1 and 2, contains a piezoelectric crystal which acts both as a transmitter and receiver. Transducer 1, which is identical in construction and operation to transducer 2, is used for explanation purposes. When the reference transducer 6 and the sensing transducer 1 (having a high frequency crystal 1a) is pulsed, the ultrasound travels from the crystal to the outer tube surface 7 where a portion of the energy is reflected. However, some of the energy enters the tube wall and travels in the form of an utrasonic longitudinal wave to the back or internal surface 8 of the tube wall. The transducers are aligned relative to the tube such that the ultrasound impinges normal to the outer tube surface and hence, the ultrasound that enters the tube wall is not refracted. At the back wall surface 8 of the tube 5, most of the energy is reflected back through the path it travelled to the crystal 1a. This signal arrives at a time later than the signal received from the outer surface. The time difference between outer and back wall tube surfaces is proportional to wall thickness.

The reference transducer 6 as shown in FIG. 3a, also includes only a single piezoelectric crystal 6a which operates both as a transmitter and receiver and may be identical to the sensing transducers. The function of the reference crystal is only to obtain a surface signal from a stationary object and is not directed at the tube being measured, but rather at the water tank wall 3 or other suitable stationary reference point.

The operation of the electronics employed with the aforedescribed transducer arrangement is best described with reference to the block diagram shown in FIG. 4 and the corresponding timing sequence chart of FIG. 2.

The electronic clock 14 provides the necessary timing pulses for proper system operation. The clock output can be varied in frequency being generally set at 5,000 pulses per second. The clock output pulses 44 of FIG. 2A are simultaneously applied to three identical high voltage pulse generators 15, 16 and 17 and reference gate generator 18.

The function of the high voltage generators is to apply a fast rise time, short duration, high voltage electrical pulse to the piezoelectric crystals. This electrical energy is converted to mechanical energy, in the form of ultrasound, by the crystal. The ultrasound travels through the water to the outer tube surface, in the case of the two data or sensing transducers, and to the water tank wall surface for the reference transducer.

The energy from the tank wall is reflected back to the crystal, converted to an electrical signal 45 of FIG. 2D and amplified by the reference amplifier 19.

The outside tube surface signals 46 and 47 of FIG. 2B and 2C from each of the two data transducers are applied to amplifiers 20 and 21, where they are amplified to voltage levels sufficient to operate subsequent circuits.

The reference signal gate generator 18 produces a voltage pulse 48 of adjustable duration as shown in FIG. 2E. It is initiated by the clock pulses 44 and is set to end at a time shortly after the reference transducer tank wall surface signal. This rectangular pulse is applied to the reference gate 22. The tank wall signal 45 is allowed to pass through the reference gate when the reference gate pulse is also applied. This signal turns on the displacement timers 23 and 26 and rectangular pulses 49 and 50 of FIGS. 2F and 2G are initiated. These pulses are terminated by the arrival of the two tube outer surface signals 46 and 47 from the two data transducers 1 and 2. Thus, the time duration of the pulse outputs of the displacement timers are proportional to the two transducer-to-tube displacements.

In addition to being applied to the displacement timers, these tube outer surface signals are are also applied to the two wall timers 24 and 28. Here again, the signals turn on the timers and rectangular pulses 51 and 52 (see FIGS. 2H and 2I) are initiated, which are not terminated until the arrival of the individual back surface signals 70 and 71 in FIGS. 2B and 2C. The duration of these pulses are then proportional to the individual wall thickness.

Because the trailing edge of the tube outer surface signals 46 and 47 are not smooth, but rather irregular, inhibit signals 53 and 54 in FIGS. 2J and 2K produced by inhibit gate generator 25 and 27 are applied to the two wall timers to prevent false triggering. These inhibit signals are initiated by the turn off of the respective displacement timers. This duration is adjustable and set so that they terminate after the individual tube outer surface signals have returned to approximately zero volts. During the application of the inhibit signals, the wall timers cannot be turned off.

Time-to-voltage conversion of the wall and displacement timing pulses 49, 50, 51 and 52 takes place by separate but identical voltage ramp generators. The duration of the wall timing pulses are converted to voltage levels 58 and 59 as shown in FIGS. 2O and 2P by wall ramp generators 29 and 30. The peak readers 31 and 32 are circuits which essentially follow and hold the ramp voltages until the voltages are appropriately sampled by the sampling pulse. The individual sampling pulses are generated in the following manner. The trailing edge of inhibit pulse 54 is used to turn on delay 36. This delay generates a rectangular pulse 55 of FIG. 2L of adjustable time duration. The exact duration is not critical, however, it must last for several microseconds after the ramp generators have reached full value. The trailing edge of the delay pulse turns on sampler gate generator 37 and the sampler gate pulse 60 in FIG. 2Q is initiated. Again, the time durations are not critical and are generally set to last about 100 microseconds. It is this pulse which is applied to the peak readers and allows the data to pass on to subsequent circuits.

The time-to-voltage conversion for the two displacement timing pulses 49 and 50 is performed in an identical manner by displacement ramp generators 33 and 34, whereby voltage ramps 56 and 57 in FIGS. 2M and 2N are generated. Displacement peak readers 35 and 72 perform in a manner identical to the wall peak readers 31 and 32. The same sampling pulse which is applied to the wall peak readers is also applied to the displacement peak readers 35 and 72.

The outputs 61 and 62 shown in FIG. 2R and 2S of wall peak readers 31 and 32, which are varying DC voltages (analog) proportional to the two wall thickness readings, are summed by wall summation circuit 38 to produce analog voltage 63 (See. Fig. 2T).

The output of wall peak reader 32 is also coupled to the wall recorder drive circuit 39 which conditions the voltage for application to a strip chart recorder.

The outputs 64 and 65 of displacement peak readers 35 and 72 are summed by the displacement summation circuit 40 to produce a voltage output 66 proportional to the tube OD (outside diameter). This voltage is coupled in parallel to OD recorder drive 41 and the summation of wall and OD circuit 42. Here the negative of the summation of the two walls is summed to the OD signal, the resultant being voltage 67 proportional to the ID. The ID voltage is conditioned by the ID recorder drive 43 before being applied to the recorder.

Ramp reset generator 68 receives clock pulses 44 also and subsequently generates pulse 69 to reset all ramp generators prior to the occurrence of the succeeding transmit pulse.

FIG. 5 discloses a typical actual physical arrangement of the present invention. A strip chart recorder 9 is used to record the measurement data. However, trip circuits can be easily used instead of the recorder with suitable red light or audible alarms actuated whenever any of the measurements exceed predetermined limits. A unit 10 including an oscilloscope for displaying the various signals is connected between the recorder and transducers for processing the received signals.

It will be understood that various changes in the details and arrangements of parts and operating conditions which have been hereinabove described and illustrated in order to explain the nature of the preferred embodiment of this invention may be made by those skilled in the art within the principles thereof, and that reference should be made to the following appended claims for determination of the scope of this invention.

What is claimed is:

1. An ultrasonic system for simultaneously determining the inside and outside diameters and wall thickness of tubular objects, comprising in combination, first means containing a couplant medium capable of transferring ultrasonic energy for use in obtaining date for the measurement of said inside and outside diameters and wall thickness of said tubular objects disposed in said couplant medium in said first means, transducer means fixedly mounted externally of said tubular objects in said first means and immersed in said couplant medium for producing ultrasonic energy upon activation thereof, said transducer means comprising first and second transducers mounted diametrically opposite each other relative to said tubular objects in said first means for obtaining data for use in measuring said inside and outside diameters and wall thickness, electronic circuit means operably connected to said first and second transducers for producing electronic signals corresponding to the energy reflected back to and received by said transducers respectively from the tubular objects and processing said signals to provide output signals representative of the inside diameter, outside diameter and wall thickness of the tubular object being measured, and reference transducer means fixedly mounted externally of said tubular objects in said first means relative to a fixed surface and immersed in said couplant medium, said reference transducer means operably connected to said electronic circuit means for being activated simultaneously with said first and second transducers for producing a reference signal, and said electronic circuit means processing said reference signal with said electronic signals so as to automatically compensate said system for temperature variations in said couplant medium 2. The system of claim 1 wherein said circuit means comprises pulse means for simultaneously activating said first and second transducers and said reference transducer, amplifier means for receiving signals from each of said transducers and amplifying said signals to levels sufficient to operate timer circuit means for generating electrical pulses proportional to time intervals between predetermined ones of the amplified signals, conversion circuit means for converting said time signals to voltage signals, and sequential timing circuit means for sequentially processing said signals in a predetermined manner to provide output voltage signals proportional to the outside diameter, inside diameter, and wall thickness of said tubular objects respectively.

3. The system of claim 2 including drive circuit means operably connected with said sequential timing circuit means and recorder means for receiving said output voltage signals and processing said signals to a level sufficient to drive said recorder means.

4. The system of claim 3 wherein each of said inside and outside diameter and wall thickness is displayed separately on said recorder means, whereby ovality of the tubular objects readily may be ascertained.

5. The system of claim 1 wherein said couplant medium comprises water.

6. The system of claim 1 wherein said couplant medium comprises oil.

7. The system of claim 1 including means for translating the tubular objects past said transducer means so that the diameters and wall thickness are measured on a helical path of travel of said objects.

8. The system of claim 1 wherein each transducer comprises a piezoelectric crystal for transmitting and receiving ultrasonic energy.

9. The system of claim 1 wherein said first and second transducers are arranged relative to the tubular object being measured such that said ultrasonic energy impinges normal to the outer surface thereof.

10. The system of claim 1 wherein said electronic circuit means includes pulse means for simultaneously activating said first and second transducers and said reference transducer, said reference transducer upon being activated by said pulse means transmitting an ultrasonic signal at said fixed surface and receiving an ultrasonic signal reflected back from said fixed surface before said first and second transducers receive the reflected signals from the tubular object being measured, said electronic circuit means including gating means for permitting the output signal received from said reference transducer to pass therethrough for actuating displacement timer means, said displacement timer means producing output pulses which are terminated upon arrival at said timer means of first ones of said electronic signals produced by said first and second transducers whereby the time duration of said output pulses of said displacement timer means is proportional to the displacement between said first and second transducers and the tubular object being measured, wall timer means also actuated by said first electronic signals for producing output pulses which are terminated upon arrival at said wall timer means of second ones of said electronic signals from said first and second transducers whereby the duration of said output pulses are proportional to the thickness of the tubular object being measured, conversion means for converting said output pulses to voltage level signals, peak reading means for reading the maximum level of said voltage level signals, and first summation circuit means for summing the output readings of said peak reading means for providing an output voltage which is proportional to the outside diameter of the tubular object being measured and second summation circuit means for providing an output voltage which is proportional to the inside diameter of the tubular object being measured.

11. The system of claim 10 wherein said electronic circuit means includes reset circuit means for resetting said conversion means prior to the occurrence of the next transmit pulse by said pulse means.

12. The system of claim 10 wherein said first and second transducer means each receives first ultrasonic signals reflected from the outer surface of the tubular object being measured and second ultrasonic signals reflected back from the interior surface of the tubular object being measured and for producing electronic signals respectively corresponding thereto, said first ones of said electronic signals corresponding to said first ultrasonic signals and said second ones of said electronic signals corresponding to said second ultrasonic signals.

13. A method for the simultaneous determination of the inside and outside diameters and wall thickness of a tubular member, comprising the steps of:
  a. providing an energy coupling medium capable of transferring ultrasonic energy;
  b. passing said tubular member having a void interior in a helical path of movement through said medium;
  c. impinging ultrasonic energy througn said medium in a normal direction on the exterior and interior surfaces of said tubular member from fixed energy producing means located externally of and on diametrically opposite sides thereof, whereby said energy is reflected back from said surfaces to said energy producing means;
  d. converting the reflected energy into electrical signals; and
  e. electronically processing said electrical signals into output signals proportional to the outside diameter, inside diameter and wall thickness of said tubular member.

14. The method of claim 13 including the step of impinging ultrasonic energy through said medium on a fixed surface from fixed energy producing reference means whereby said energy is reflected back from said fixed surface to said energy producing reference means, converting the reflected energy to an electrical reference signal, and electronically processing said electrical signals with reference to said electrical reference signal to automatically compensate for temperature variations in said coupling medium.

15. The method of claim 13 wherein first ultrasonic energy signals are reflected back from the outer surface of said tubular member and second ultrasonic energy signals are reflected back from the inner surface of said tubular member comprising the steps of:
  f. converting the first and second reflected ultrasonic energy signals into first and second voltage signals;
  g. electronically processing said first and second voltage signals into output signals proportional to said outside diameter and inside diameter and wall thickness of said tubular member including adding said first voltage signals, obtaining a voltage signal corresponding to the duration of time between the first and second reflected ultrasonic energy signals, and subtracting from the summation of said first voltage signals a voltage signal corresponding to the time delay between said first and second voltage signals reflected back.

16. An ultrasonic system for the simultaneous determination of the inside and outside diameters and wall thickness of a tubular member having inner and outer surfaces, comprising in combination, container means for containing a couplant medium capable of transferring ultrasonic energy for use in obtaining data for the measurement of said diameters and thickness of said tubular member, said tubular member being void and disposed in said couplant medium in said container means, first and second transducer means fixedly mounted externally of said tubular member in said couplant medium for producing ultrasonic signals upon activation thereof and mounted diametrically opposite each other relative to said tubular member for directing said ultrasonic signals normal to said tubular member, and reference transducer means fixedly mounted externally of said tubular member in said couplant medium relative to a fixed surface, said first and second transducer means and said reference transducer means operably connected with electronic circuit means including clock means for providing timing pulses at a predetermined frequency for simultaneous application to voltage pulse generator means and reference gate generator means, said voltage pulse generator means producing output pulses which are coupled to said first and second transducer means and said reference transducer means, said first and second transducer means converting said output pulses to ultrasonic signals for transmission through said couplant medium inaa normal direction relative to said tubular member in said couplant medium, at least a portion of said ultrasonic signals being reflected back from said outer surface of said tubular member to said first and second transducer means and the remainder of said ultrasonic signals being reflected back from the inner surface of said tubular member to said first and second transducer means, said first and second transducer means converting the reflected back signals to outer and inner tube surface electrical signals, said reference transducer means producing an ultrasonic signal and directing it to said fixed surface whereupon it is reflected back to said reference transducer means for conversion to an electrical reference signal, said electronic circuit means processing said surface electrical signals with reference to said electrical reference signal for automatically compensating said system for temperature variations in said couplant, amplifier means for amplifying said electrical reference signal and surface electrical signals from each of said transducers, displacement timer means receiving said electrical reference signal and producing output pulses, said outer tube surface electrical signals also being applied to said displacement timer means for terminating said output pulses therefrom whereby the time duration of said output pulses is proportional to the displacement between said first and second transducer means and said tubular member, said wall timer means also receiving said outer tube surface signals and producing output pulses, said inner tube surface signals also being applied to said wall timer means for terminating said output pulses therefrom whereby the duration of said output pulses is proportional to the thickness of said tubular member, conversion means comprising voltage ramp generators for converting the timing pulses produced by said wall timer means and said displacement timer means to voltage levels, peak reading circuit means operably connected with said voltage ramp generator means, and summation circuit means connected with said peak reading circuit means for producing analog voltages corresponding to the wall thickness, the inside diameter of and the outside diameter of said tubular member, whereby the outside and inside diameters and said wall thickness are substantially independent of temperature variations in said couplant medium.

17. Ths system of claim 16 including triggering inhibiting means for preventing false triggereing of said wall timer means, said signal inhibiting means being activated when said displacement timer means is turned off and terminating operation when said outer tube surface electrical signals have returned to substantially zero voltage level.

18. The system of claim 16 including ramp reset generator means for receiving said timing pulses and generating pulses for resetting said voltage ramp generators prior to the next succeeding timing pulse.

19. An ultrasonic system for simultaneously determining the inside and outside diameters and wall thickness of tubular objects, comprising in combination, first means containing a couplant medium for transferring ultrasonic energy signals for use in obtaining data for the measurement of said inside and outside diameters and said wall thickness of each of said tubular objects disposed in said couplant medium in said first means, transducer means fixedly mounted externally of said tubular object in said first means and immersed in said couplant medium for producing initial ultrasonic energy signals upon activation thereof and impinging said energy signals on said tubular object being measured, said transducers means comprising first and second transducers mounted diametrically opposite each other relative to said tubular object in said couplant medium for obtaining data for use in measuring said inside and outside diameters and said wall thickness, said first and second transducers receiving first and second ultrasonic energy signals reflected back from the outer and inner surfaces of said tubular object being measured respectively, said first ultrasonic energy signal comprising a portion of said initial energy signal impinged on said tubular object being measured and being reflected from said outer surface thereof, and said second ultrasonic energy signal comprising the remainder of said initial energy signal which passes through the wall of said tubular object being measured and is reflected from said inner surface thereof, said first and second transducers converting said first and second ultrasonic energy signals to first and second electrical signals respectively, electronic circuit means operably connected to said first and second transducers for receiving said first and second electrical signals and producing further corresponding electrical signals and processing said further electrical signals with respect to a reference electrical signal to provide output signals representative of said inside diameter and outside diameter and said wall thickness of said tubular object being measured, and reference transducer means fixedly mounted externally of said tubular object in said first means relative to a fixed surface and immersed in said couplant medium, said reference transducer means operably connected to said electronic circuit means for being activated substantially simultaneously with said first and second transducers to produce said reference signal, and said electronic circuit means constructed and arranged for processing said electrical signals with respect to said reference signal such that said system automatically is compensated for temperature variations in said couplant medium whereby said output signals are independent of temperature variations in said couplant medium and the measurements of said inside and outside diameters and said wall thickness are highly accurate.

20. The system of claim 19 wherein said electronic circuit means sums said first ultrasonic energy signals from each of said first and second transducers respectively for determining said outside diameter of said tubular object.

* * * * *